US008533820B2

(12) United States Patent
Shieh

(10) Patent No.: US 8,533,820 B2
(45) Date of Patent: Sep. 10, 2013

(54) RESERVED WRITE POSITIONS ON INSTALL MEDIA

(75) Inventor: Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1558 days.

(21) Appl. No.: 11/609,424

(22) Filed: Dec. 12, 2006

(65) Prior Publication Data

US 2008/0141291 A1 Jun. 12, 2008

(51) Int. Cl.
*G06F 21/00* (2013.01)

(52) U.S. Cl.
USPC ............. 726/22; 709/219; 709/203; 455/419; 455/420; 711/125; 711/154

(58) Field of Classification Search
USPC ............. 720/718; 369/275.3, 47.12; 726/26, 726/22
See application file for complete search history.

(56) References Cited

U.S. PATENT DOCUMENTS

| | | | | |
|---|---|---|---|---|
| 4,831,517 A * | 5/1989 | Crouse et al. | .................. | 714/6.13 |
| 5,132,954 A | 7/1992 | Kulakowski et al. | | |
| 5,481,713 A * | 1/1996 | Wetmore et al. | .............. | 717/170 |
| 5,546,557 A | 8/1996 | Allen et al. | | |
| 5,950,012 A * | 9/1999 | Shiell et al. | .................... | 717/169 |
| 6,049,672 A * | 4/2000 | Shiell et al. | .................... | 717/168 |
| 6,205,112 B1 * | 3/2001 | Weidner | ...................... | 369/275.3 |
| 6,256,232 B1 * | 7/2001 | Chang et al. | ............. | 365/185.33 |
| 6,327,617 B1 * | 12/2001 | Fawcett | ........................ | 709/219 |
| 6,438,664 B1 * | 8/2002 | McGrath et al. | ............... | 711/154 |
| 6,757,837 B1 * | 6/2004 | Platt et al. | ................... | 714/38.13 |
| 6,760,908 B2 * | 7/2004 | Ren | ................................ | 717/173 |
| 6,839,894 B1 * | 1/2005 | Joshi et al. | ..................... | 717/130 |
| 7,027,806 B2 * | 4/2006 | Rajaram et al. | ............... | 455/419 |
| 7,028,011 B1 | 4/2006 | Ha et al. | | |
| 7,126,906 B2 | 10/2006 | Iida | | |
| 7,398,272 B2 * | 7/2008 | Hindawi et al. | ............... | 709/203 |
| 7,542,758 B2 | 6/2009 | Rajaram et al. | | |
| 8,286,238 B2 * | 10/2012 | Durham et al. | .................. | 726/22 |
| 2001/0020295 A1 | 9/2001 | Satoh | | |
| 2002/0097648 A1 | 7/2002 | Iida | | |
| 2003/0028867 A1 * | 2/2003 | Kryloff et al. | ................. | 717/171 |
| 2004/0237068 A1 * | 11/2004 | Ren | ............................... | 717/110 |

(Continued)

FOREIGN PATENT DOCUMENTS

| | | |
|---|---|---|
| EP | 0628906 A2 | 12/1994 |
| EP | 0628906 A3 | 12/1994 |

(Continued)

OTHER PUBLICATIONS

Patch Summary and Release Notes for Patch Kit|http://h30097.www3.hp.com/docs/patch/40G/bl22/ReleaseNotes.pdf|Aug. 2003|HP|pp. 1-15.*

(Continued)

*Primary Examiner* — Mahfuzur Rahman
(74) *Attorney, Agent, or Firm* — Yee & Associates, P.C.; Steven L. Bennett

(57) ABSTRACT

A storage medium that is one of a compact disk and a digital versatile disk. The storage medium includes a first portion, the first portion being an area of the storage medium that is read-only only. The storage medium includes a second portion, the second portion being another area of the storage medium upon which a second set of data can be written.

8 Claims, 2 Drawing Sheets

(56) References Cited

U.S. PATENT DOCUMENTS

2005/0120242 A1* 6/2005 Mayer et al. .................. 713/201
2006/0223517 A1* 10/2006 Rajaram et al. ............... 455/419
2007/0083713 A1* 4/2007 Torrini et al. ................. 711/125
2007/0091746 A1* 4/2007 Brunet et al. .............. 369/47.12

FOREIGN PATENT DOCUMENTS

| | | |
|---|---|---|
| EP | 1160655 A2 | 12/2001 |
| EP | 1469385 A2 | 10/2004 |
| EP | 1617325 A1 | 1/2006 |
| JP | 7084839 A | 3/1995 |
| JP | 2643093 B2 | 8/1997 |
| JP | 9231612 A | 9/1997 |
| JP | 2000099338 A | 4/2000 |
| JP | 2001043071 A | 2/2001 |
| JP | 2001135022 A | 5/2001 |
| JP | 2002244753 A | 8/2002 |
| JP | 2003016728 A | 1/2003 |
| JP | 2003157660 A | 5/2003 |
| JP | 2004303405 A | 10/2004 |
| JP | 2005190243 A | 7/2005 |
| JP | 2006048882 A | 2/2006 |
| WO | 0116684 A1 | 3/2001 |
| WO | 0198900 A2 | 12/2001 |
| WO | 2006060463 A1 | 6/2006 |

OTHER PUBLICATIONS

Grimes et al., "System Independent Method for Updating System Code", IBM Technical Disclosure Bulletin, Apr. 1994, pp. 217-220.

* cited by examiner

RESERVED WRITE POSITIONS ON INSTALL MEDIA

BACKGROUND OF THE INVENTION

1. Field of the Invention

The present invention relates generally to an improved data processing system and in particular to a method and apparatus for storing data. More particularly, the present invention relates to a computer implemented method, apparatus, and a computer usable program product for storing data on a portion of a disk.

2. Description of the Related Art

Software companies often find themselves in a tug-of-war between meeting tight production schedules and producing high quality products that contain all desirable features and that are free of problems, such as software bugs. Unfortunately, most software, including operating systems, is still distributed via disks, such as compact disks (CDs) or digital versatile disks (DVDs). These types of storage media require a long lead time when ordering production of the disks, because factories requires considerable time to press disks and store software on the disks. Thus, while the factories are pressing disks and storing software onto the disks, the software developer is often continuing to test and change the software to be sold. As a result, the software stored on many or all of the manufactured disks is out of date by the time the disks are sold in the open market.

Currently, software developers address this problem by developing one or more patches for the software stored on the manufactured disks. A patch is a software program that modifies or replaces a related, but older software program. When a user purchases the disk, the user may then access a network, such as the Internet, and subsequently download the patch or patches. The user then installs the patches in order to upgrade the purchased application to the most up-to-date version.

Several problems exist with using patches to upgrade software stored on disks. One problem is that the user can only access the patch using a network. If the user's access to the network is impaired or if the user's computer doesn't operate because the software is defective, then the user cannot obtain the patch which is supposed to correct the problem. Another problem is that multiple patches might need to be implemented in a particular order. Although all patches can be combined into a single large patch, a user might not need most of the features contained in the single large patch.

A third problem is waste of disks. For example, a software developer orders and causes to be manufactured a first set of ten million disks. Each disk stores some software, which could be a game, operating system, or any other software. The software developer develops a new patch for the software. The software developer then announces that the software developer will order a second set of disks to be manufactured, with the second set of disks containing the fully updated version of the software. Any remaining disks in the first set of disks become nearly useless, as consumers will be reluctant to purchase the older software. As a result, potentially millions of disks and a great deal of money is wasted. Thus, it would be advantageous to have an improved method, apparatus, and computer usable program code for storing data on a storage medium such as a compact disk or a digital versatile disk.

SUMMARY OF THE INVENTION

Illustrative embodiments provide for a storage medium that is one of a compact disk and a digital versatile disk. The storage medium includes a first portion, the first portion being an area of the storage medium that is read-only. The storage medium includes a second portion, the second portion being another area of the storage medium upon which a second set of data can be written.

Another illustrative embodiment provides that an application is stored on the first portion and no data is stored on the second portion.

Another illustrative embodiment provides that an install image of an application is stored on the first portion and a patch for the application is stored on the second portion.

Another illustrative embodiment provides that the second portion is adapted such that a password is required to perform an action with respect to the second portion. The action may be one of writing to the second portion and reading from the second portion.

Another illustrative embodiment provides that an application is stored on the first portion and that a password required to perform an action with respect to the application is stored on the second portion. The action may be one of running the application and installing the application.

Another illustrative embodiment provides that a second set of data is stored on the first portion. The second set of data is encrypted according to an encryption key. The encryption key is stored on the second portion.

Another illustrative embodiment provides that the second portion is adapted to be written only once.

Another illustrative embodiment provides that a link is stored on the second portion. The link is associated with a Website related to an application stored on the first portion.

Another illustrative embodiment provides that the Website contains content selected from the group consisting of a help file for the application, a patch for the application, a supplement for the application, a module for the application, a definition for the application, a library for the application, a user group associated with the application, and contact information regarding the developer of the application.

Another illustrative embodiment provides that a first application is stored on the first portion and a second application is stored on the second portion.

Another illustrative embodiment provides for a method of storing information on a storage medium that is one of a compact disk and a digital versatile disk. The method includes segmenting the storage medium into a first portion. The first portion is one of a read-only portion or a write-once portion. The method also includes segmenting the storage medium into a second portion. The second portion is a writable portion. A portion is writable if data can be written once only or can be written multiple times to the corresponding portion of the storage medium. Not both of the first portion and the second portion are write-once.

Another illustrative embodiment provides for causing an application to be stored on the first portion while avoiding storage of data on the second portion.

Another illustrative embodiment provides for causing an install image of an application to be stored on the first portion and causing a patch for the application to be stored on the second portion.

Another illustrative embodiment provides that the second portion is adapted such that a password is required to perform an action with respect to the second portion. The action is one of writing to the second portion and reading from the second portion.

Another illustrative embodiment provides for causing an application to be stored on the first portion and causing a password required to perform an action with respect to the application to be stored on the second portion. The action may be one of running the application and installing the application.

Another illustrative embodiment provides for causing a first set of data to be stored on the first portion. The first set of data is encrypted according to an encryption key. Additionally, this embodiment provides for causing the encryption key to be stored on the second portion.

Another illustrative embodiment provides for causing a link to be stored on the second portion. The link is associated with a Website related to an application stored on the first portion.

Another illustrative embodiment provides that the Website contains content selected from the group consisting of a help file for the application, a patch for the application, a supplement for the application, a module for the application, a definition for the application, a library for the application, a user group associated with the application, and contact information regarding the developer of the application.

Another illustrative embodiment provides for causing a first application to be stored on the first portion and causing a second application to be stored on the second portion.

Another illustrative embodiment provides for a method of storing information on a storage medium. The method includes writing a first set of data to a first portion of a storage medium. The first portion is a writable portion. The storage medium comprises one of a compact disk and a digital versatile disk. The storage medium has a second portion. The second portion is a read-only portion.

Another illustrative embodiment provides for causing a second set of data to be stored on the second portion.

Another illustrative embodiment provides that the first set of data is a first application and that the second set of data is a second application.

Another illustrative embodiment provides that an install image of an application is stored on the second portion. The first set of data is a patch for the application.

Another illustrative embodiment provides that the first portion is adapted such that a password is required to perform an action with respect to the first portion. The action may be one of writing to the first portion and reading from the first portion.

Another illustrative embodiment provides that the first set of data comprises a password required to perform an action with respect to an application stored on the second portion. The action may be one of running the application and installing the application.

Another illustrative embodiment provides that a second set of data is stored on the second portion. The second set of data is encrypted according to an encryption key. The first set of data is the encryption key.

Another illustrative embodiment provides that the first set of data is a link. The link is associated with a Website related to an application stored on the second portion.

Another illustrative embodiment provides that wherein the Website contains content selected from the group consisting of a help file for the application, a patch for the application, a supplement for the application, a module for the application, a definition for the application, a library for the application, a user group associated with the application, and contact information regarding the developer of the application.

Another illustrative embodiment provides for a computer program product. The computer program product includes a computer usable medium having computer usable program code for storing information on a storage medium that is one of a compact disk and a digital versatile disk. The storage medium further includes a first portion and a second portion. The first portion is a read-only portion and the second portion is a writable portion. The computer program product includes computer usable program code for writing a first set of data to the second portion.

Another illustrative embodiment provides for computer usable program code for causing a second set of data to be stored on the first portion.

Another illustrative embodiment provides that the first set of data is a first application and the second set of data is a second application.

Another illustrative embodiment provides that an install image of an application is stored on the first portion and the second set of data is a patch for the application.

Another illustrative embodiment provides for a data processing system. The data processing system includes a processor, a bus connected to the processor, and a computer usable medium connected to the bus. The computer usable medium contains a set of instructions for storing information on a storage medium. The storage medium is one of a compact disk and a digital versatile disk. The processor is adapted to carry out the set of instructions to segment the storage medium into a first portion. The first portion is one of a read-only portion or a write-once portion. The processor is also adapted to carry out the set of instructions to segment the storage medium into a second portion. The second portion is a writable portion. Not both of the first portion and the second portion are write-once.

Another illustrative embodiment provides that the processor is further adapted to carry out the set of instructions to cause an application to be stored on the first portion while avoiding storage of data on the second portion.

Another illustrative embodiment provides that the processor is further adapted to carry out the set of instructions to cause an install image of an application to be stored on the first portion, and to cause a patch for the application to be stored on the second portion.

Another illustrative embodiment provides that the second portion of the storage media can be used by the first running application of the first portion of the storage media as a working "scratchpad" or read-write area in the event that the first running application needs a location to write temporary files during its execution. This method bypasses the need for the first running application to use system memory store.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
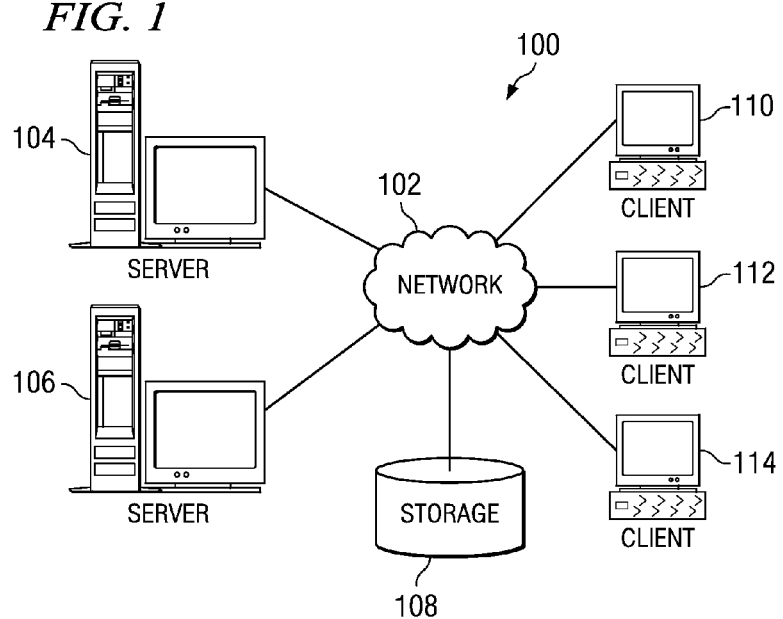
FIG. 1 is a pictorial representation of a network of data processing systems in which illustrative embodiments may be implemented.
Figure 2:
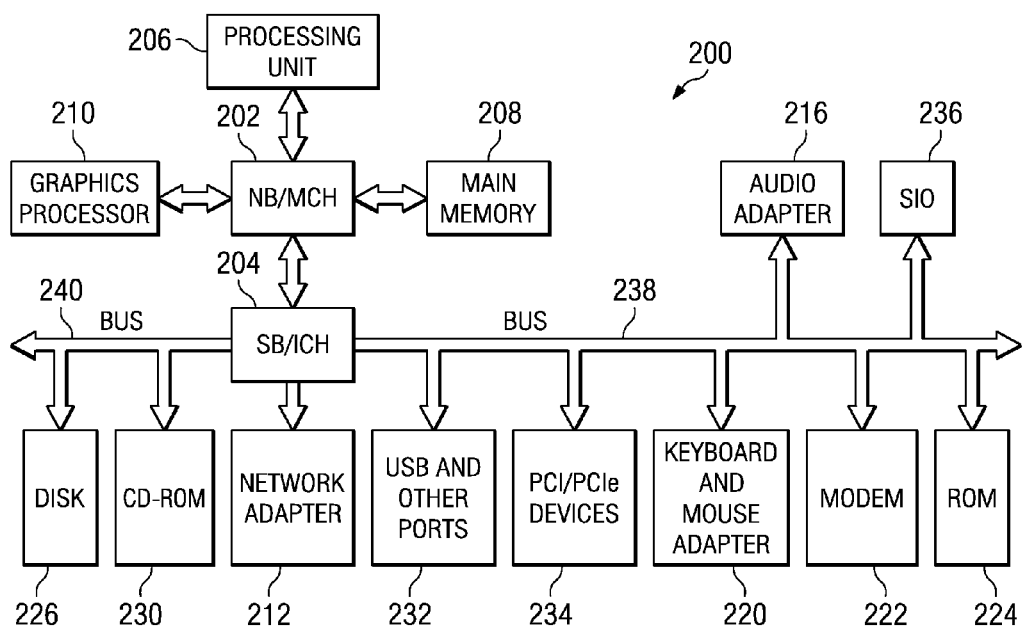
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 is a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as MICROSOFT® WINDOWS® XP (MICROSOFT and WINDOWS are trademarks of Microsoft Corporation in the United States, other countries, or both). An object oriented programming system, such as the JAVA™ programming system, may run in conjunction with the operating system and provides calls to the operating system from JAVA programs or applications executing on data processing system 200. JAVA and all JAVA-based trademarks are trademarks of Sun Microsystems, Inc, in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

Illustrative embodiments provide for a storage medium that is one of a compact disk and a digital versatile disk. The storage medium includes a first portion, the first portion being read-only. The storage medium includes a second portion, the second portion being writable. A portion is writable if data can be written once only or can be written multiple times to the corresponding portion of the storage medium. Other illustrative embodiments provide for methods, devices, and computer program products for creating such a storage medium. Specifically, the computer and network shown in FIG. 1 and FIG. 2 can be used to implement the illustrative embodiments via the use of computer usable program code.

The illustrative embodiments overcome problems associated with known methods of storing data on a storage medium such as compact disks or digital versatile disks. For example, a patch for an application can be downloaded after purchasing the compact disk and then written to the writable portion of the storage medium. In this way, a user need not store the patch on a hard drive, which might become corrupted and require re-installation of the original program in the first place. The user need not store the patch on a separate drive which can be lost or somehow disassociated with the original disk upon which the application is stored. Thus, a complete installation image of the application, including the downloaded patches, can be stored on a single disk using the illustrative embodiments.

Figure 3:
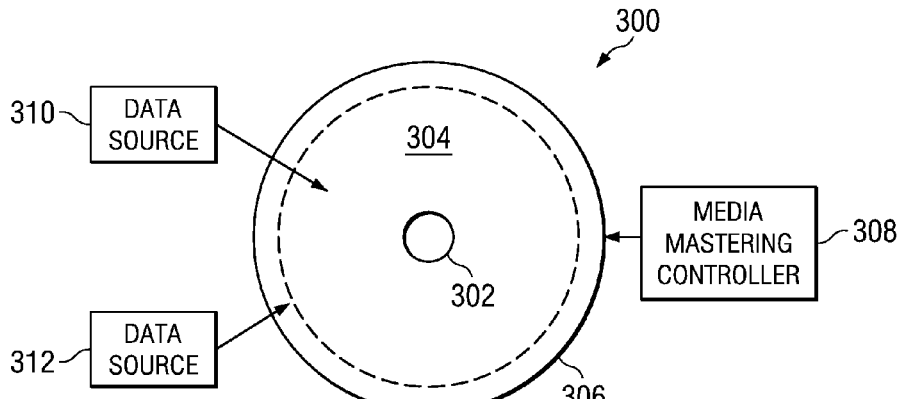
FIG. 3 is a drawing illustrating a storage medium in accordance with an illustrative embodiment.

FIG. 3 is a drawing illustrating a storage medium in accordance with an illustrative embodiment. In this example, storage medium 300 is a disk, such as a compact disk (CD) or digital versatile disk (DVD), formerly known as a digital video disk. Storage medium 300 is suitable for use with any of a number of different types of data processing systems, such as server 104, server 106, client 110, client 112, and client 114 in FIG. 1, or with data processing system 200 in FIG. 2. Storage medium 300 may include a hole 302 for use in securing storage medium 300 in a disk reader, disk writer, or disk read/writer.

Storage medium 300 includes two portions, a reserved portion 304 and a remaining portion 306. Reserved portion 304 usually contains the bulk of the software or data that a software developer or other entity desires to distribute. In this illustrative embodiment, reserved portion 304 is designated as read-only. Thus, after storing desired data on reserved portion 304, no further data can be written to reserved portion 304. In another illustrative example, data can be written to reserved portion 304 only once.

However, remaining portion 306 is not read-only. In an illustrative example, remaining portion 306 is writable. A portion is writable if data can be written once only or can be written multiple times to the corresponding portion of the storage medium. Thus, once storage medium 300 is released for sale, users can write data to remaining portion 306. In another illustrative example, data can be written to remaining portion 306 only once.

Media mastering controller 308 can be used to control which portions of storage medium 300 are reserved portion 304 and which portions are remaining portion 306. Examples of media mastering controller 308 include ROXIO'S EASY MEDIA CREATOR®, MEDIASTREAM'S NEODVD®, or similar software or hardware with similar functionality. Media mastering controller 308 sets control bits on the storage media such that the media is read only once data has been written onto sectors that the user or manufacturer wish to remain permanent data. Those areas or sectors that are to be treated as read-write or write-once do not have the read-only bit enabled. Other mechanisms for setting reserved portion 304 and remaining portion 306 can be used.

The relative sizes of reserved portion 304 and remaining portion 306 can vary. In one illustrative example, reserved portion 304 occupies 95 percent of storage medium 300 and remaining portion 306 occupies 5 percent of storage medium 300. However, reserved portion 304 and remaining portion 306 can occupy different relative portions of storage medium 300. For example, remaining portion 306 could occupy half or more of storage medium 300, with reserved portion 304 occupying a correspondingly less proportion of storage medium 300.

Additionally, remaining portion 306 can be placed on any particular portion of storage medium 300 relative to reserved portion 304. For example, remaining portion 306 can be placed between two different sections of reserved portions. Additionally, more than one reserved portion 304 can be provided on storage medium 300.

In use, a user can purchase storage medium 300, upon which a desired application or desired data is stored in reserved portion 304. In an illustrative example, the desired data stored in reserved portion 304 is an install image of an application. Thereafter, the user can download a patch for the application via a network. The user then uses a writer to store the patch to remaining portion 306. A writer is any device which can be used to write data onto a storage medium such as a compact disk or a digital versatile disk. In this way, the patch and the application are stored together on the same disk.

Thus, multiple data sources can be used at different times to write data to storage medium 300. For example, data source 310 can be the desired application described above. Data source 310 in this example is the source of data for data written to reserved portion 304. Similarly, data source 312 can be the patch described above. Data source 312 in this example is the source of data for data written to remaining portion 306.

Additionally, more than two data sources can be used. A single data source can be used to write to both reserved portion 304 and remaining portion 306. Data sources can be any source of data, including a source from which data is downloaded via a network. Each of data source 310 and data source 312 can have multiple sub-sources of data.

If desired, the software developer can provide code in the application or elsewhere in storage medium 300 such that the application will automatically reference any patches stored in remaining portion 306. Thus, when installing or re-installing the purchased application, the installation process automatically and appropriately adds any patches or updates to the application being installed.

In another illustrative example, the user can cause a password, key, or other security information associated with data stored in reserved portion 304 to be stored in remaining portion 306. For example, a very long password or security key required to install and/or run an application can be stored on remaining portion 306. Thus, the user can reduce the chance of losing any passwords necessary for installation or use of the purchased application.

Stated similarly, an application is stored on reserved portion 304. A password required to perform an action with respect to the application is stored on remaining portion 306. The action can be running the application, installing the application, or taking some other action with respect to the application.

In another illustrative example, remaining portion 306 can be adapted such that a password is required to access some or all data stored in remaining portion 306. In another illustrative example, such a password can be set by the user in order to secure any data written to remaining portion 306. In other words, remaining portion 306 is adapted such that a password is required to perform an action with respect to the remaining portion 306. The action can be writing data to remaining portion 306, reading data from remaining portion 306, or taking some other action with respect to remaining portion 306.

In another illustrative example, one or more links can be written to remaining portion 306. A link can be a hyperlink to a Web site or a link to some other document, possibly stored on reserved portion 304. The Website can contain any desired content. In an illustrative embodiment, the link is associated with a Website related to an application or other data stored on reserved portion 304. Examples of Website content include a help file for the application, a patch for the application, a supplement for the application, a module for the application, a definition for the application, a library for the application, a user group associated with the application, and contact information regarding the developer of the application. In other illustrative examples, the only method of accessing one or more of these Websites is to use the links stored on remaining portion 306.

In another illustrative example, data stored in reserved portion 304 can be encrypted. For example, data stored in reserved portion 304 can be encrypted using a private encryption key. The private encryption key can be stored in remaining portion 306. If desired, the encryption algorithm can automatically use the key stored in remaining portion 306. In an illustrative embodiment the private encryption key can only be downloaded via a network from the software developer after purchase of storage medium 300. In this manner, the manufacturer can increase the security of the data stored in reserved portion 304. Although this example refers to a private encryption key, a public encryption key can also be used. Thus, a set of encrypted data is stored on reserved portion 304. The set of encrypted data is encrypted according to an encryption key. The encryption key is stored on remaining portion 306.

In still another illustrative example, remaining portion 306 can be left empty. In other words, storing data in remaining portion 306 can be avoided initially. Later during the manufacturing process, an application in reserved portion 304 or the data stored to reserved portion 304 in a first set of disks is found to be defective. However, the first set of disks is only a fraction of the total number of manufactured disks. In the past, often the entire set of manufactured disks had to be destroyed, resulting in lost time and money. However, the software developer or manufacturer can cause patches or fixes to be stored in the remaining portions 306 in only the first set of disks. Thus, the software developer or manufacturer need not destroy the entire set of disks, but instead can provide fixes to those disks that are defective. This process can be performed before the complete set of disks is released to the open market.

In still another illustrative embodiment, a first application can be stored on reserved portion 304 and a second application can be stored on remaining portion 306. In some illustrative embodiments, the user can cause the second application to be stored on remaining portion 306. The second application can be related to the first application, but could also be unrelated to the first application.

Figure 4:
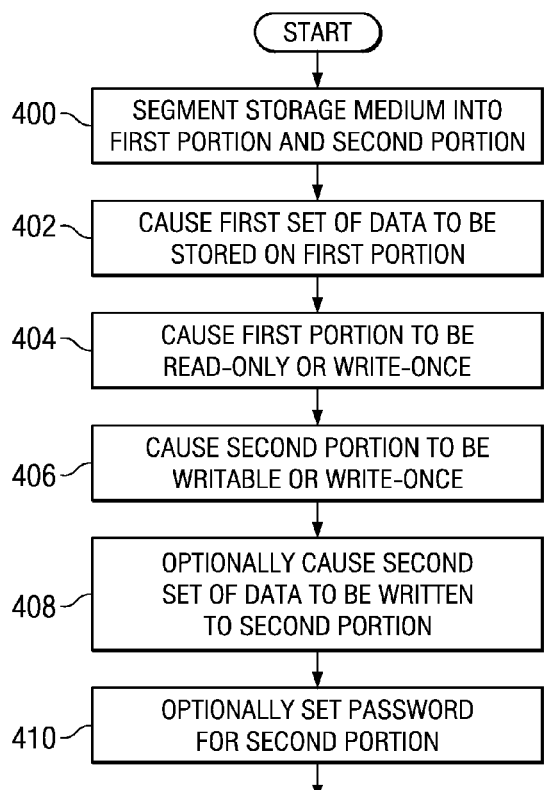
FIG. 4 is a flowchart of a process for segmenting a storage medium into first and second portions in accordance with an illustrative embodiment.

FIG. 4 is a flowchart of a process for segmenting a storage medium into first and second portions in accordance with an illustrative embodiment. The process shown in FIG. 4 can be implemented on a computer or other data processing system, such as server 104, server 106, client 110, client 112, and client 114 in FIG. 1, or with data processing system 200 in FIG. 2. A media mastering controller, such as media mastering controller 308 can be used to implement the process shown in FIG. 4. The process shown in FIG. 4 can be implemented with respect to one or more disks, such as storage medium 300 shown in FIG. 3.

The process begins as a processor implements segmentation of the storage medium into a first portion and a second portion (step 400). In this particular illustrative example, the first portion corresponds to reserved portion 304 and the second portion corresponds to remaining portion 306, as shown in FIG. 3. The processor causes a first set of data to be stored on the first portion (step 402). Next, the processor causes the first portion to be read-only or write-once (step 404) using a media mastering controller. A portion is read-only if data stored on the corresponding portion of the storage medium can only be read. A portion is write-once if data can be written once to the corresponding portion of the storage medium, but thereafter the data can only be read from that portion.

The processor then causes the second portion to be writable (step 406). A portion is writable if data can be written once only or can be written multiple times to the corresponding portion of the storage medium. Optionally, the processor causes a second set of data to be written to the second portion (step 408). In other illustrative embodiments, the end user writes data to the second portion.

Also optionally, a password can be set for the second portion (step 410). Similarly, the second portion can be adapted to allow a user to set a password with respect to the second portion. The password restricts access to the second portion of the storage medium.

Figure 5:
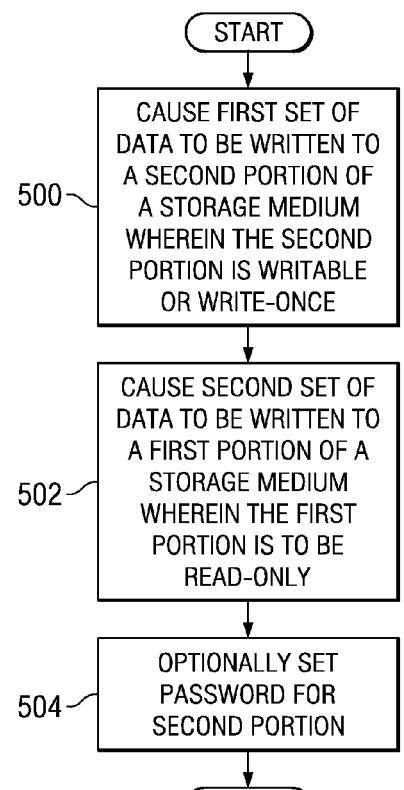
FIG. 5 is a flowchart of a process for writing data to a storage medium in accordance with an illustrative embodiment.

FIG. 5 is a flowchart of a process for writing data to a storage medium in accordance with an illustrative embodiment. The process shown in FIG. 5 can be implemented on a computer or other data processing system, such as server 104, server 106, client 110, client 112, and client 114 in FIG. 1, or with data processing system 200 in FIG. 2. A media mastering controller, such as media mastering controller 308 can be used to implement the process shown in FIG. 5. The process shown in FIG. 5 can be implemented with respect to one or more disks, such as storage medium 300 shown in FIG. 3.

The process begins as a processor causes a first set of data to be written to a second portion of a storage medium (step 500). The second portion of the storage medium is writable. The processor then causes a second set of data to be written to a first portion of a storage medium (step 502). The first portion of the storage medium will be designated or adapted to be read-only. Finally, the processor optionally sets a password for the second portion (step 504). The password restricts access to the second portion of the storage medium.

Thus, illustrative embodiments provide a storage medium that may be, for example, a compact disk or a digital versatile disk. The storage medium includes a first portion, the first portion being read-only. The storage medium includes a second portion, the second portion being writable. The nature of the first portion and the second portion can be varied, as described above. Other illustrative embodiments provide for methods, devices, and computer program products for creating such a storage medium.

The illustrative embodiments overcome problems associated with known methods of storing data on a storage medium such as compact disks or digital versatile disks. For example, a patch for an application can be downloaded after purchasing the compact disk and then written to the writable portion of the storage medium. In this way, a user need not store the patch on a hard drive, which might become corrupted and require re-installation of the original program in the first place. The user need not store the patch on a separate drive which can be lost or somehow disassociated with the original disk upon which the application is stored. Thus, a complete installation image of the application, including the downloaded patches, can be stored on a single disk using the illustrative embodiments.

Additionally, a software manufacturer can potentially save money using the illustrative embodiments. For example, if a subset of a set of manufactured disks has defective data, then the manufacturer can provide a fix which can be stored on the writable portion of the disk. Thus, instead of throwing away all of the disks and starting over again, the manufacturer can provide a fix or solution to the problem. In this manner the manufacturer can address the problem in a much more cost efficient manner.

Other illustrative embodiments also exist. For example, data stored on a first portion of the disk can be encrypted. The encryption key then can be provided on the second portion at the same time or at a time different than when the encrypted data is stored on the first portion of the disk. Additionally, the user can cause a password associated with data stored elsewhere on the disk to be stored in the writable portion.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of storing an application on a storage medium, the method comprising:
    segmenting the storage medium into a first portion and a second portion, wherein the storage medium comprises one of a compact disk and a digital versatile disk, wherein the first portion comprises one of a read-only portion and a write-once portion, and wherein the second portion comprises a writable portion;
    storing the application on the first portion;
    storing program code within the application on the first portion to automatically add any patch stored on the second portion to the application when the application is being installed;
    responsive to identifying a problem with the application already stored on the first portion, storing a patch for the application on the writable portion of the second portion;
    storing a password required to perform an action with respect to the application on the second portion, the action comprising one of running the application and installing the application;
    storing a first set of data on the first portion, wherein the first set of data is encrypted according to an encryption key; and
    storing the encryption key on the second portion.

2. The method of claim 1 further comprising:
    determining, during a manufacturing process for storing the application on the storage medium, whether data within the application stored on the first portion is defective; and
    responsive to determining that the data is defective, detecting the problem with the application and storing the patch on the second portion during the manufacturing process and prior to the storage medium being sold on an open market.

3. The method of claim 1 wherein the second portion is adapted such that the password is required to perform an action with respect to the second portion, the action comprising one of writing to the second portion and reading from the second portion.

4. The method of claim 1, wherein the patch for the application provides a fix for the problem detected with the application.

5. The method of claim 1 further comprising:
    storing a link associated with a Website related to the application on the writable portion of the second portion wherein the Website contains content selected from a group consisting of a help file for the application, the patch for the application, a supplement for the application, a module for the application, a definition for the application, a library for the application, a user group associated with the application, and contact information regarding a developer of the application.

6. A method of storing an installation image of an application on a storage medium, the method comprising:
    obtaining the storage medium including the application stored on a read-only portion of the storage medium, wherein the storage medium comprises one of a compact disk and a digital versatile disk, wherein the storage medium is segmented into the read-only portion and a writable portion, and wherein the application includes program code to automatically add any patch stored on the writable portion to the application when the application is being installed;

responsive to identifying a patch available for the application, downloading the patch for the application via a network and storing the patch on the writable portion of the storage medium to form the installation image of the application;

storing a password required to perform an action with respect to the application on the writable portion, the action comprising one of running the application and installing the application;

storing an encryption key on the second portion wherein the application is encrypted according to the encryption key.

7. The method of claim 6, wherein the patch for the application provides a fix for a problem detected with the application.

8. The method of claim 6 further comprising:

storing a link associated with a Website related to the application on the writable portion wherein the Website contains content selected from a group consisting of a help file for the application, the patch for the application, a supplement for the application, a module for the application, a definition for the application, a library for the application, a user group associated with the application, and contact information regarding a developer of the application.

* * * * *